July 11, 1939.  F. W. HALL  2,166,005
SOLVENT REFINING MINERAL OIL
Filed April 4, 1936
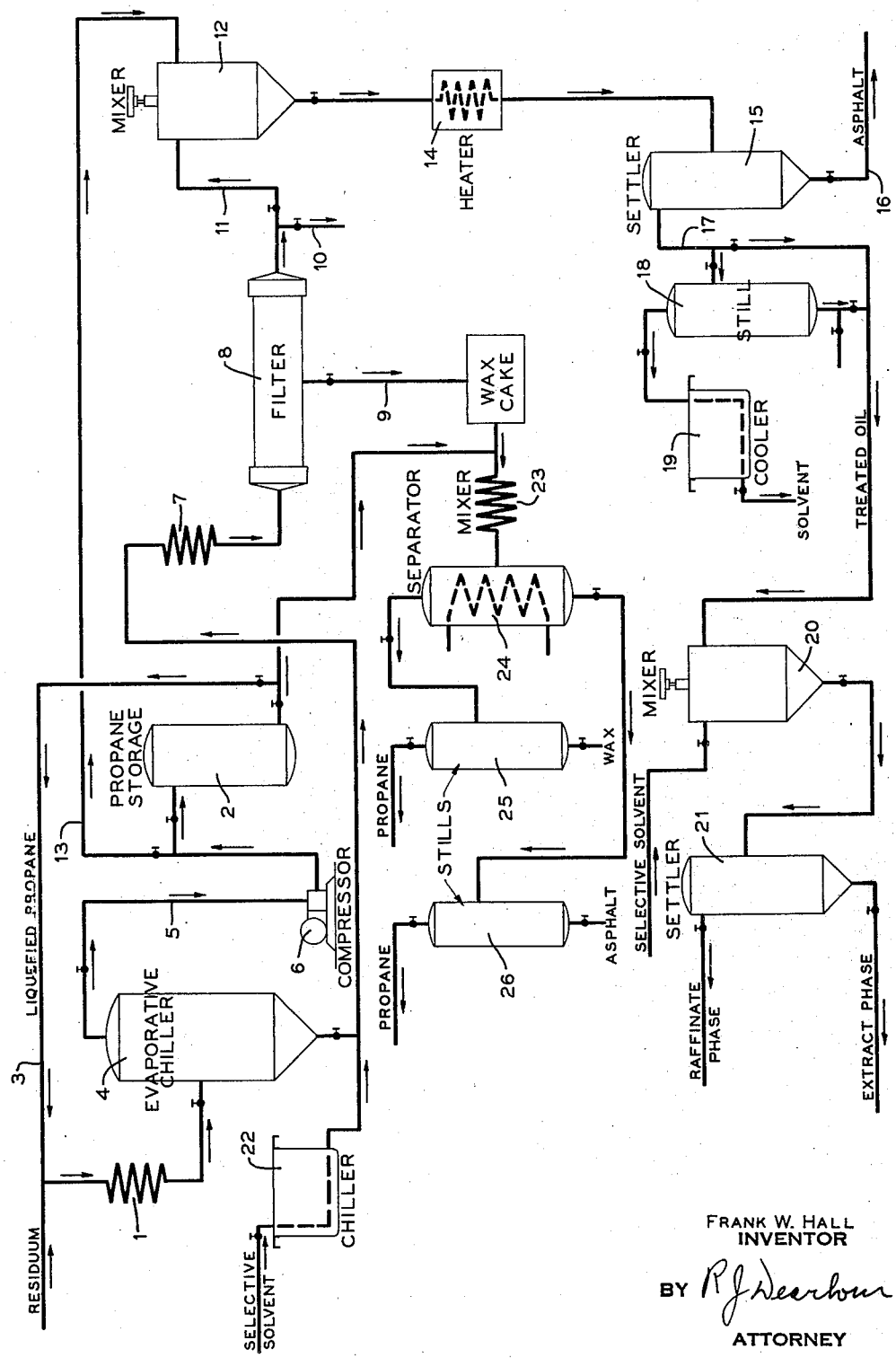
FRANK W. HALL
INVENTOR
BY R.J. Dearbour
ATTORNEY Patented July 11, 1939

2,166,005

UNITED STATES PATENT OFFICE 2,166,005

SOLVENT REFINING MINERAL OIL

Frank W. Hall, New York, N. Y., assignor to The Texas Company, New York, N. Y., a corporation of Delaware Application April 4, 1936, Serial No. 72,708

2 Claims. (Cl. 196—13)

This invention relates to the solvent refining of mineral oil for the removal of wax, asphaltic, and other undesired constituents.

The invention particularly concerns a process for the removal of wax and other undesired constituents from residual wax-bearing fractions of mineral oil, such as cylinder stock residuum. It contemplates a process wherein a residual lubricating oil fraction is mixed with a solvent comprising a light petroleum fraction of the character of propane, and the resulting mixture chilled so that the wax constituents, together with a suitable proportion of the asphaltic constituents of the oil, are precipitated in the form of a hard, granular precipitate which is very readily filterable. After filtering the cold mixture to remove the precipitated material, the resulting dewaxed filtrate is then subjected to further treatment to remove the resinous and remaining portion of the asphaltic constituents of the oil. Following this, the oil may be subjected to extraction with a selective solvent mixture in order to further extract therefrom undesired constituents of relatively low viscosity index.

The light petroleum fraction used as a solvent in effecting the removal of the wax and asphaltic bodies may consist of propane, or it may comprise a mixture of propane with other normally gaseous hydrocarbons, such as ethane, propylene, butane, and such as are found in natural gasoline. It is also contemplated that the dewaxing step may be effected in the presence of a wax anti-solvent liquid, such as acetone, methyl ethyl ketone, or other selective solvent liquid, such as liquid sulphur dioxide, nitrobenzene, dichlorethyl ether, aniline, benzaldehyde, etc., having selective solvent action as between wax and oil at temperatures of 0° F. and below.

When a selective solvent liquid, such as above mentioned, is employed as a wax anti-solvent in the dewaxing step, that portion of the selective solvent liquid remaining in the dewaxed filtrate advantageously comprises a portion of the selective solvent mixture utilized in the subsequent and final extracting steps for the removal of low viscosity index or so-called "naphthenic" constituents.

Heavy residual wax-bearing fractions, such as cylinder stock residuum, obtained from Mid-Continent crude, contain large amounts of asphaltic and resinous bodies in addition to the wax. For example, such a residuum may contain around 12% to 18% by volume of paraffin wax, and around 30% to 40% by volume of tarry material. This proportion of tar represents the portion of the oil removed in the acid layer obtained when about five parts of the residuum diluted with an equal quantity of Stoddard solvent, are agitated with about one part of 93.2% sulphuric acid. This tarry material comprises constituents which are of the character of asphaltenes, and also constituents which are of a resinous nature.

I have discovered that certain of these asphaltic constituents which are precipitated from a mixture of about one part of residuum and three to four parts of propane, at normal room temperature (about 70° F.) and below impart free-filtering characteristics to the wax precipitated from such oil. These particular asphaltic constituents, which are believed to be of the asphaltene type, separate from the mixture in a relatively dry, hard, granular form. They are to be contrasted with the bulk of the asphaltic constituents which remains in solution in the solvent at these low temperatures but precipitate therefrom at temperatures above normal room temperature. These constituents which are insoluble in the mixture at the lower temperatures provide a very effective filter-aid material for aiding in the filtration of solidified wax from a mixture of wax-bearing oil and solvent or diluent.

I have discovered that, when the wax is precipitated from the solution in the presence of these insoluble asphaltic constituents, the resulting pricipitate is of a hard, granular nature, and such that it can be removed from the solution by filtration at comparatively rapid rates. These rates of filtration may range from ten to a hundred times as rapid as those prevailing in the case where these asphaltic constituents are not present in the filter cake. Likewise, the filtration rate is much more rapid than that prevailing in the case of dewaxing a distillate lubricating oil fraction from the same crude source. Distillate lubricating oil fractions, as a general rule, are relatively free from asphaltic material. The asphaltic constituents having the desired filter-aid properties, if present at all in the distillate type of oil, are apparently present in amounts insufficient to have the desired beneficial action upon the filtration rate during dewaxing.

In dewaxing a residual cylinder stock, such as above mentioned, the proportion of propane, and the temperature of mixing, should be adjusted so that only the desired asphaltic constituents are present as a precipitate in the desired proportion. The proportion of asphaltic constituents suitable in the filter cake is up to about 20% or 25% of the total asphaltic constituents present in the oil. The high rate of filtration referred to above is attained when the filter cake comprises up to about one part of asphaltic material to about three parts of wax, or, in other words, when the cake contains from about 2% to 5% of the asphaltic matter contained in the residuum.

For example, it was found in the case of a cylinder stock residuum derived from Manvel crude, that when the wax was precipitated in the presence of a portion of the asphaltic constituents of the residuum, and the wax so precipitated was removed by filtration, the resulting filter cake was of a hard, granular nature, and was characterized by free-filtering characteristics, as indicated by the high rate at which the mixture could be filtered.

In this instance, the residuum was mixed with propane in the proportion of one part of residuum to six parts of propane. Complete mixing was effected at normal room temperature. The mixture was then chilled to $-50°$ F. by indirect contact with a refrigerant. The chilled mixture was then filtered in a pressure filter.

The resulting filter cake was of a distinctly hard, granular nature, and possessed free-filtering characteristics to a very high degree. It comprised about 2.92% of the residuum, and had the following analysis:

Per cent wax_____ 36.5
Per cent tar (A. R. A.)_____ 1.26
Per cent oil_____ 62.24

The tests on the residuum, before and after dewaxing, were as follows:

|  | Before dewaxing | After dewaxing |
| --- | --- | --- |
| Gravity °A. P. I. | 17.7 | — |
| S. U. viscosity at 210° F. | 863 | 650 |
| Pour °F. | 65 | 45 |
| Per cent tar | 44 | — |
| A. R. A. tar test: |  |  |
| Insoluble impurities | 0.06 | 0.01 |
| Tar | 0.075 | 0.01 |

Although the pour test of the dewaxed residuum in this particular instance was not very low, a lower pour test oil could be obtained by reducing the amount of propane used.

The proportion of propane used in this particular example is somewhat larger than should be used to obtain the optimum results; that is, for more complete dewaxing, the proportion of propane is preferably about three to four parts of propane to one part of oil.

In order to more fully describe the process of my invention, reference will now be made to the accompanying drawing showing a flow diagram of the process.

A cylinder stock residuum derived from Mid-Continent crude, such as referred to above, is drawn from a source not shown and introduced to a turbulence or mixing coil 1. Liquefied propane from a storage tank 2 is conducted through a pipe 3 to the mixing coil 1. The mixing is effected at normal atmospheric temperature. The proportion of propane to residum is such that, after chilling in the evaporative chiller 4, the chilled mixture will consist of about three to four parts of propane to one part of residuum.

The mixture from the coil 1 is introduced to the evaporative chiller 4 wherein the surplus propane is evaporated from the mixture so as to produce chilling. The evaporated propane is drawn off from the top of the chiller through a pipe 5 to a compressor 6. In this manner, the mixture of propane and residuum is chilled to a temperature of around 0° to $-50°$ F., depending upon the nature of the stock and the desired pour test of the dewaxed oil.

The cold mixture from the bottom of the chiller 4 is introduced through a coil 7 to a filter 8, which is advantageously of the Vallez type.

The resulting filter cake of wax containing some asphaltic constituents is withdrawn from the filter through a pipe 9. The resulting dewaxed filtrate may be withdrawn from the system through a pipe 10, or instead, may be conducted through a pipe 11 to a mixer 12 for the purpose of removing the resinous and remaining asphaltic constituents.

In the mixer 12, the dewaxed filtrate is mixed with an additional quantity of propane introduced through a pipe 13 from the storage tank 2. The amount of propane thus added is sufficient to produce a mixture containing about six to eight parts of propane and one part of dewaxed oil. From the mixer 12, the mixture is conducted through a heater 14 wherein the mixture is warmed up to a temperature of around 130° to 140° F. At this temperature, it is introduced to a settler 15 wherein the asphaltic and resinous constituents, comprising the bulk of the asphalt originally contained in the oil, are precipitated.

The precipitated asphalt is removed through a pipe 16 while the solution of oil and propane is drawn off through a pipe 17 to a still 18 wherein the solvent may be stripped from the oil, the vaporized solvent being drawn off to a cooler 19.

Where it is desired to subject the oil from which the asphaltic constituents have been removed to a further treatment for the removal of low viscosity index constituents, the solution from the top of the settler 15 may by-pass the still 18 and be conducted directly to a mixer 20 wherein it is mixed with a suitable proportion of selective solvent, such as ketone, dichlorethyl ether, benzaldehyde, etc.

The mixture from the mixer 20 is conducted to a settler 21 wherein separation into extract and raffinate phases occurs. These phases are withdrawn and the solvent recovered therefrom, the raffinate phase oil comprising high viscosity index lubricating oil, while the extract phase oil is of relatively low viscosity index.

Where it is desired to effect the dewaxing in the presence of a wax anti-solvent liquid, this may be done by introducing the anti-solvent in the proper proportion to the mixing coil 7, previously referred to. In this case, the selective solvent comprising ketone, such as methyl ethyl ketone, or other liquids such as dichloroethyl ether, benzaldehyde, etc., is drawn from a source not shown and conducted through a chiller 22 wherein it is chilled to substantially the temperature of the chilled mixture of propane and residuum leaving the evaporative chiller 4. If desired, the anti-solvent, particularly if it is a relatively high-boiling liquid, may be introduced directly to the evaporative chiller 4.

The advantage of employing a wax anti-solvent liquid is that the mixture of propane and selective solvent will provide, at temperatures of 0° F. and below, a solvent mixture which will have more complete selective action between wax and oil.

The wax anti-solvent liquid advantageously comprises the same selective solvent which is used in the final, extracting step. It remains in the dewaxed oil during its passage through the mixer 12 and the settler 15, for the purpose of removing the asphaltic bodies. In this case, the oil being removed from the settler 15 retains the bulk of the selective solvent liquid so that it is only necessary to add a further proportion of the same selective solvent in the mixer 20 in order to effect the final extracting operation wherein the oil is separated into fractions respectively rich in high and low viscosity index constituents.

While certain solvent proportions and conditions of temperature have been specified in the foregoing description, it is contemplated that these may be varied, depending upon the nature of the stock undergoing treatment, as well as upon the degree of purification desired.

Moreover, while chilling by evaporation of the surplus propane from the mixture in the dewaxing step has been described above, it is contemplated that the conventional indirect method of chilling may be employed wherein the mixture of oil and solvent is caused to flow in indirect heat exchange relationship with a chilling medium, such as brine or other refrigerant.

The filter cake or slack wax removed from the filter in the dewaxing step is advantageously subjected to a deasphaltizing treatment, similar to that described above in connection with the dewaxed filtrate, for the purpose of removing the asphaltic constituents from the wax. Thus, the slack wax is mixed wth an additional quantity of propane so as to produce a mixture composed of about one part slack wax to from four to six parts propane. This mixture is then warmed up to a temperature of around 130° F. or just sufficient to dissolve the wax while leaving the asphaltic constituents insoluble. The solution is then removed as, for example, by decantation, leaving the insoluble asphaltic constituents.

The solvent is then removed from the decanted solution by distillation, leaving the wax substantially free from asphaltic constituents.

Thus, referring to the drawing, the wax cake is introduced to a mixing coil 23 wherein it is mixed with liquid propane drawn from the storage tank 2. From the mixer 23, the resulting mixture is conducted to a separator 24 which is provided with an internal heating coil for the purpose of maintaining the contents of the separator at the proper temperature. Separation into layers results, the upper layers being a solution of wax in propane, while the bottom layer is a mixture of asphaltic material and some propane.

The upper layer is then drawn off to a still 25, while the bottom layer is drawn off to a separate still 26. From these stills, the propane is stripped from the wax and asphalt respectively.

Obviously, many modifications and variations of the invention, as hereinbefore set forth, may be made without departing from the spirit and scope thereof, and therefore only such limitations should be imposed as are indicated in the appended claims.

I claim:

1. In the dewaxing of heavy residual wax-bearing mineral lubricating oil having the essential characteristics of a heavy cylinder stock residuum derived from Manvel crude having a relatively high content of wax and containing asphaltic and resinous constituents including asphaltene constituents which are precipitated in hard granular form from a mixture of about one part of oil and three or four parts of propane at a temperature of around 0° F. and below, the method which comprises mixing the oil containing around 12 to 18% of wax and around 30 to 40% of tarry material with a liquefied normally gaseous hydrocarbon in proportions such that upon chilling to around 0° F. and below wax and a small amount of hard granular asphaltene constituents are precipitated while the bulk of the asphaltic and resinous constituents remain in solution, chilling the mixture to around 0° F. and below, forming a free-filtering precipitate of wax and hard granular asphaltene constituents, said asphaltene constituents comprising around 2% to 5% of the asphaltic matter contained in the charge oil, filtering the cold mixture to remove said precipitate, at a rate greatly in excess of that obtaining in the absence of said hard asphalt and producing a dewaxed filtrate solution containing the bulk of the asphaltic constituents.

2. In the dewaxing of heavy residual wax-bearing mineral lubricating oil having the essential characteristics of a heavy cylinder stock residuum derived from Manvel crude having a relatively high content of wax and containing asphaltic and resinous constituents including asphaltene constituents which are precipitated in hard granular form from a mixture of about one part of oil and three or four parts of propane at a temperature of around 0° F. and below, the method which comprises mixing the oil containing around 12 to 18% of wax and around 30 to 40% of tarry material with a liquefied normally gaseous hydrocarbon in proportions such that upon chilling to around 0° F. and below wax and a small amount of hard granular asphaltene constituents are precipitated while the bulk of the asphaltic and resinous constituents remain in solution, chilling the mixture to around 0° F. and below, forming a free-filtering precipitate of wax and hard granular asphaltene constituents, said asphaltene constituents comprising around 2% to 5% of the asphaltic matter contained in the charge oil, filtering the cold mixture to remove said precipitate and produce a dewaxed mixture containing the bulk of asphaltic and resinous constituents, adding a further quantity of liquefied hydrocarbon solvent to the dewaxed mixture, maintaining the resulting mixture at an elevated temperature of around 130 to 140% F. sufficient to precipitate resinous and asphaltic constituents retained in the mixture, and removing the precipitated material therefrom.

FRANK W. HALL.